(12) United States Patent
Tomago et al.

(10) Patent No.: US 6,776,253 B2
(45) Date of Patent: Aug. 17, 2004

(54) ELECTRIC POWER STEERING APPARATUS

(75) Inventors: Yasuhiro Tomago, Yao (JP); Shuzo Hirakushi, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/125,462

(22) Filed: Apr. 19, 2002

(65) Prior Publication Data

US 2002/0166715 A1 Nov. 14, 2002

(30) Foreign Application Priority Data

May 9, 2001 (JP) ........................................ 2001-138931

(51) Int. Cl.[7] .................................................. B62D 5/04

(52) U.S. Cl. ........................................ 180/444; 280/750

(58) Field of Search ................................. 180/443, 444; 280/748, 750, 751

(56) References Cited

U.S. PATENT DOCUMENTS 4,712,446 A 12/1987 Kamata et al.

FOREIGN PATENT DOCUMENTS

| EP | 1 162 124 A2 | 12/2001 | |
|----|----|----|----|
| JP | 07-96842 | 4/1995 | |
| JP | 8-175399 | 7/1996 | |
| JP | 2000296779 A | * 10/2000 | ............ B62D/1/16 |
| JP | 2002114164 A | * 4/2002 | ............ B62D/5/04 |
| JP | 2002337704 A | * 11/2002 | ............ B62D/5/04 |

* cited by examiner

Primary Examiner—Kevin Hurley
(74) Attorney, Agent, or Firm—Rabin & Berdo, PC

(57) ABSTRACT

Disclosed is an electric power steering apparatus in which an electric motor for producing a steering assist force is provided in a steering column. Vibration from the electric motor is transmitted to a member such as a knee protector, for example, supported on the steering column through a bracket. A dynamic damper for restraining resonance of the member to which the vibration is transmitted is provided in the bracket.

10 Claims, 5 Drawing Sheets

US 6,776,253 B2

ELECTRIC POWER STEERING APPARATUS

CROSS REFERENCE TO RELATED APPLCIATION

The present invention claims priority benefits under 35 §119 of Japanese Patent Application No. 2001-138931, this application of which is incorporated by reference.

BACKGROUND OF THE INVENTION

1. Field of the Invention

The present invention relates to a steering apparatus of an automobile. More particularly, it relates to a column assist type electric power steering apparatus that obtains a steering assist force by an electric motor attached to a steering column.

2. Description of Related Arts

In this type of electric power steering apparatus, an electric motor is attached to a steering column, so that vibration from the electric motor is liable to be easily transmitted to the whole steering column.

Furthermore, a knee protector for preventing the legs and the knees of a driver from striking against the steering apparatus may, in some cases, be attached to the steering column.

Generally, the knee protector is attached to the steering column through a bracket fixed to the steering column. Consequently, the knee protector easily resonates by the vibration from the electric motor. As a result, the knee protector may, in some cases, produce an abnormal sound.

There is a fear that not only the knee protector but also a functional component fixed to the steering column resonates to produce an abnormal sound.

SUMMARY OF THE INVENTION

An object of the present invention is to solve the above-mentioned technical problems and to provide an electric power steering apparatus capable of reducing the production of an abnormal sound by restraining resonance.

In a preferred aspect of the present invention, an electric power steering apparatus comprising a steering column, and an electric motor, provided in the steering column, for producing a steering assist force further comprises a member, provided in the steering column, to which vibration from the electric motor is transmitted, and a dynamic damper for restraining resonance of the member to which the vibration is transmitted.

According to the present embodiment, the resonance of the member to which the vibration is transmitted can be restrained by the dynamic damper, thereby making it possible to reduce the production of an abnormal sound by the resonance.

The foregoing and other objects, features, aspects and advantages of the present invention will become more apparent from the following detailed description of the present invention when taken in conjunction with the accompanying drawings.

DETAILED DESCRIPTION OF THE PREFERED EMBOIDMENT

Figure 1:
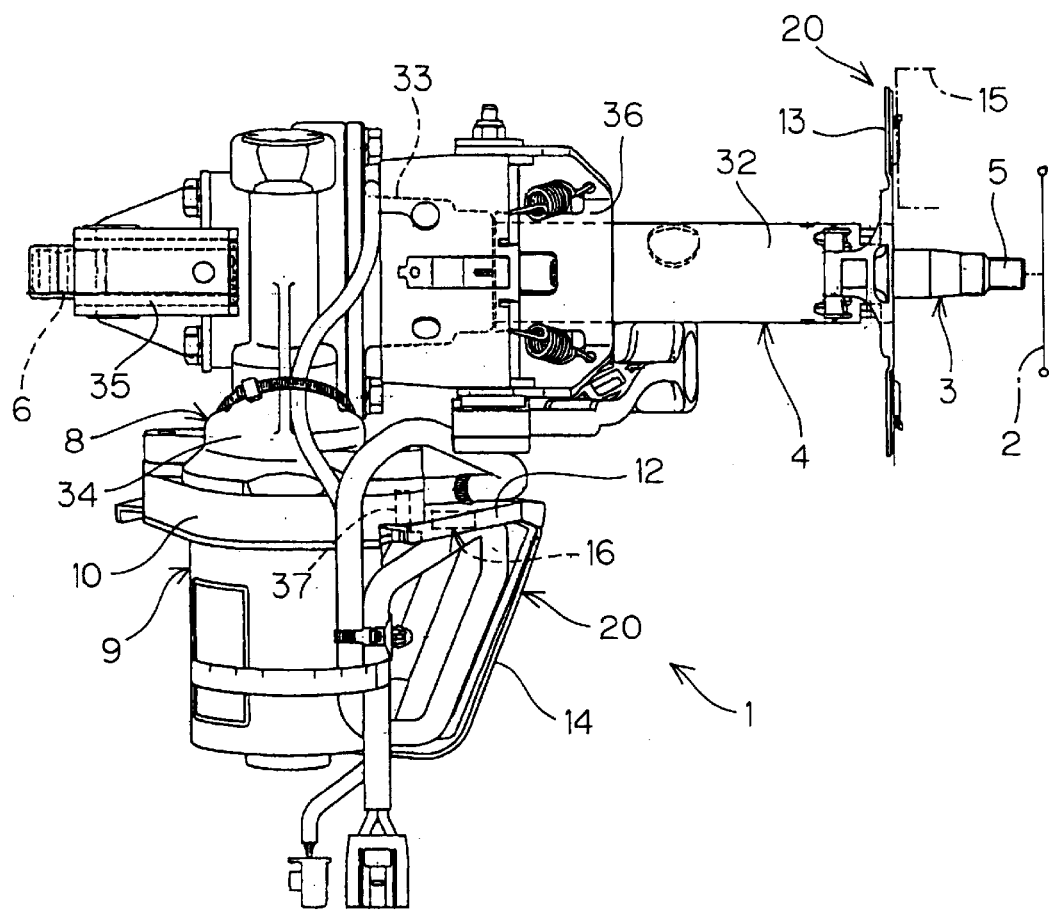
FIG. 1 is a plan view of an electric power steering apparatus according to a first embodiment of the present invention.

An electric power steering apparatus (hereinafter referred to as a steering apparatus) according to an embodiment of the present invention will be described while referring to the drawings. FIG. 1 is a plan view of a steering apparatus according to a first embodiment of the present invention.

A steering apparatus 1 has a steering shaft 3 for transmitting the movement of a steering wheel 2 (illustrated in simplified fashion in FIG. 1) for steering the wheels, and a steering column 4 for supporting the steering shaft 3 so as to be rotatable with the steering shaft 3 inserted therethrough. The steering wheel 2 is connected to one end 5 of the steering shaft 3. When the steering wheel 2 is rotated, the rotation is transmitted to the wheels through the steering shaft 3 and an intermediate shaft, a pinion, a rack shaft, and so forth (not shown) connected to the other end 6 of the steering shaft 3 so as to be integrally rotatable, thereby making it possible to steer the wheels.

The steering apparatus 1 is mounted on the body of a vehicle with a direction along the axis of the steering shaft 3 made diagonal such that the steering wheel 2 is on the upper side (in the vertical direction in FIG. 1).

Furthermore, the steering column 4 is provided with a torque sensor (not shown) for obtaining a steering assist force depending on a steering operation and a steering assist unit 8. They are arranged in a lower portion, which is on the side of the wheels, of the steering column 4.

The steering column 4 has a cylindrical jacket 32 surrounding the steering shaft 3, a sensor housing 33 attached to a lower end of the jacket 32, a unit housing 34 connected with the sensor housing 33, a lower bracket 35 fixed to the unit housing 34 so as to be attached to the vehicle body, and an upper bracket 36 fixed to the jacket 32 so as to be attached to the vehicle body. The torque sensor is accommodated in the sensor housing 33. A part of a steering assist unit 8 is accommodated in the unit housing 34.

The steering assist unit 8 has an electric motor 9, and a transmission mechanism (not shown) for transmitting the rotation of the electric motor 9 to the steering shaft 3. The transmission mechanism comprises a worm shaft connected to the axis of rotation of the electric motor 9 so as to be integrally rotatable, and a worm wheel engaging with the worm shaft. The worm wheel is attached to the steering shaft 3 so as to be integrally rotatable.

The electric motor 9 has its case 10 screwed to the unit housing 34 by a plurality of bolts.

In the steering assist unit 8, the electric motor 9 produces a steering assist force in response to a signal from a torque sensor, attached to the steering column 4, for detecting the steering operation. The steering assist force balances with a steering resistance caused by the steering operation, and is transmitted to the steering shaft 3 through the transmission mechanism.

Furthermore, a plurality of brackets 12 and 13 are fixed to the steering column 4.

The bracket 13 supports a switch 15 (only its part is illustrated in simplified fashion) serving as a member to be supported for operating a lamp or the like of the vehicle. The bracket 13 is formed separately from the steering column 4, and is fixed to the outer periphery at an upper end of the jacket 32 of the steering column 4 by welding.

The bracket 12 supports a knee protector 14 serving as a member to be supported. The bracket 12 is formed separately from the steering column 4, and is fixed to the unit housing 34 in the steering column 4 by screwing.

Figure 2:
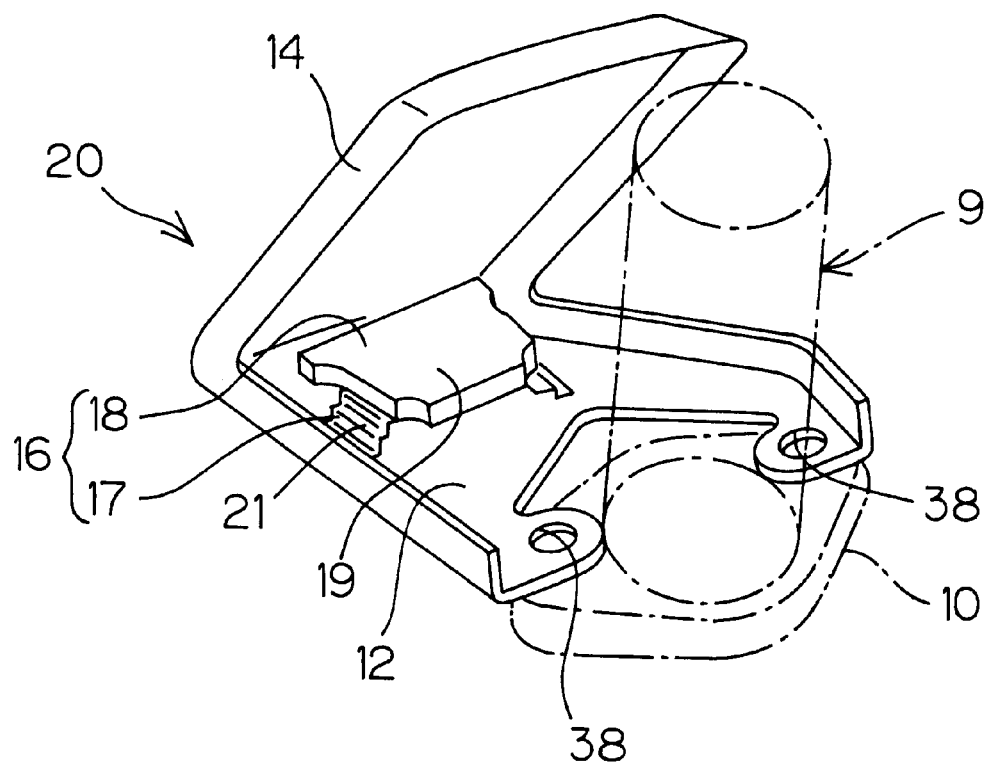
FIG. 2 is a perspective view of a dynamic damper, a bracket, a knee protector, and so forth shown in FIG. 1, where a motor is indicated by a one dot and dash line.
Figure 3:
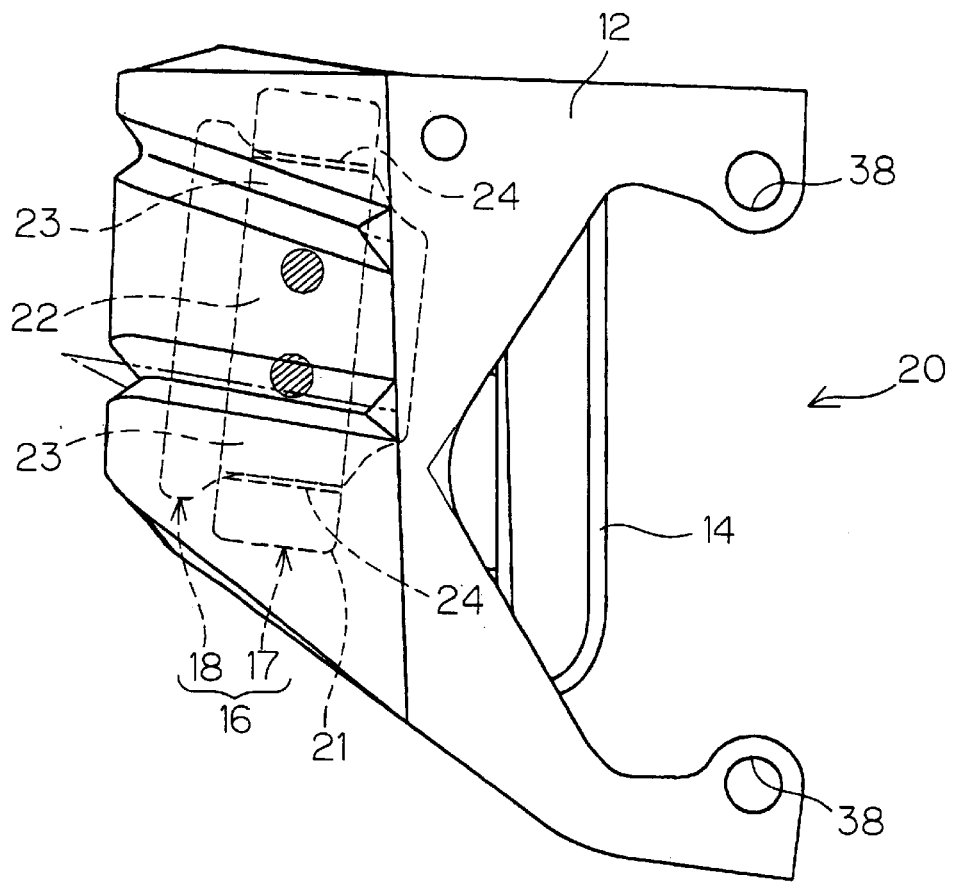
FIG. 3 is a rear view of the knee protector, etc. shown in FIG. 2.
Figure 4:
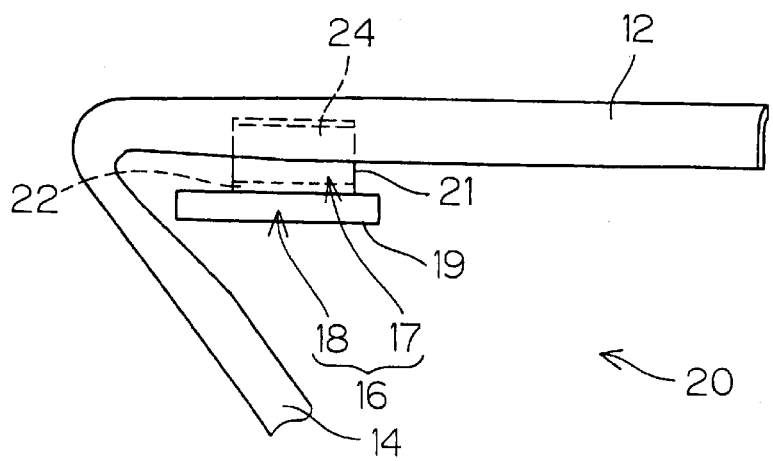
FIG. 4 is a side view of the knee protector, etc. shown in FIG. 2.

The knee protector 14 is a plate-shaped member for preventing the legs and knees of a driver from striking against the electric motor 9, as shown in FIGS. 2 to 4. The plate-shaped member is arranged such that its plate surface forms an inclined surface, as viewed from the driver. The knee protector 14 is formed using a single sheet metal integrally formed with the bracket 12 for supporting the knee protector 14. The knee protector 14 and the bracket 12 may be separately formed.

An integrally formed product has an approximately plate-shaped portion serving as the bracket 12 and a plate-shaped portion serving as the knee protector 14, and adjacent edges of both the portions are connected to each other. The integrally formed product forms an approximate V-shape. The integrally formed product is mounted, close to the vicinity of the electric motor 9. The bracket 12 and the case 10 of the electric motor 9 are together fastened and fixed to the unit housing 34 in the steering column 4 by a plurality of, for example, two bolts 37 (only parts are illustrated). Further, the integrally formed product has a plurality of, for example, two through holes 38 at its end, farther away from the edge, connected to the knee protector 14, of the portion serving as the bracket 12, and is fixed in a cantilevered state with the bolts 37 respectively inserted through the through holes 38.

The member to be supported and the bracket 12 in such a cantilevered state are generally liable to be easily vibrated. Particularly in the electric power steering apparatus 1, the electric motor 9 for producing the steering assist force is provided in the steering column 4. Vibration occurring in the electric motor 9 is transmitted to the whole steering column 4, and is easily propagated to sections such as the bracket 12 through the steering column 4. As a result, each of the sections is liable to resonate to easily produce an abnormal sound.

Therefore, in the present invention, resonance of a resonance restraint object member 20 provided in the steering column 4 is restrained using a dynamic vibration damper 16. The resonance restraint object member 20 is a member to which the vibration from the electric motor 9 is transmitted.

The dynamic damper 16 is provided in the resonance restraint object member 20 whose resonance will be restrained, for example, the bracket 12. The dynamic damper 16 comprises an elastic member 17 and a weight 18 supported on the resonance restraint object member 20 through the elastic member 17. Although the dynamic damper 16 is described later, another known construction may be also utilized as the construction of the dynamic damper 16.

The dynamic damper 16, the mass, the spring constant, and so forth of which are adjusted, restrains the resonance of the resonance restraint object member 20 provided in the steering column 4. As a result, it is possible to reduce the production of an abnormal sound by the resonance of the resonance restraint object member 20. Consequently, the production of the abnormal sound by the electric power steering apparatus 1 can be reduced.

As the resonance restraint object member 20, the bracket 13 and a member to be supported thereby, for example, can be exemplified in addition to the above-mentioned bracket 12. The bracket 13 and the member to be supported thereby may, in some cases, also resonate. In this case, it is preferable that the dynamic damper 16 is provided. The resonance restraint object member 20 may be any member, provided that it is liable to resonate to produce an abnormal sound. It is possible to restrain, if there is a member whose resonance will be restrained even in a steering apparatus having no bracket provided therein, for example, the resonance by providing the member with the dynamic damper 16 according to the present invention.

Particularly, the dynamic damper 16 is desirable for restraining the resonance of the bracket fixed to the steering column 4 in order to support the member to be supported. Such a bracket is generally liable to easily vibrate. However, the resonance of the bracket can be restrained by the dynamic damper 16. Accordingly, the production of the abnormal sound can be effectively reduced.

Furthermore, the above-mentioned bracket is provided with the dynamic damper 16, thereby making it possible to restrain the resonance of the bracket and the member to be supported collectively and effectively near its root.

Here, as the bracket fixed to the steering column 4, the brackets 12 and 13 can be exemplified. However, the bracket is not limited to the same. For example, it may be one formed integrally with the steering column 4 in addition to one formed separately from the steering column 4. Further, the member to be supported thereby is not limited.

As the member to be supported, a harness clip, a knob and a shaft of a column shift, a column cover, etc. can be exemplified in addition to the knee protector 14, the switch 15, etc.

Particularly as the bracket whose resonance is restrained by the dynamic damper 16, the bracket 12 for supporting the knee protector 14 is preferable. That is, the knee protector 14 is liable to resonate to easily produce an abnormal sound. However, the resonance of the knee protector 14 can be strained by the dynamic damper 16, thereby making it possible to more effectively reduce the production of the abnormal sound. The bracket 12 may support a member other than the knee protector 14 together with the knee protector 14. Alternatively, the bracket 12 alone may be fixed to the steering column 4, or the bracket 12, together with another member, may be fastened and fixed to the steering column 4.

Particularly when the bracket 12 for supporting the knee protector 14 and the case 10 of the electric motor 9 are together fastened to the steering column 4, it is preferable that the dynamic damper 16 is provided. That is, the knee protector 14 easily resonates because the vibration from the electric motor 9 is easily transmitted to the knee protector 14 through the bracket 12. Further, the knee protector 14 is arranged in the vicinity of the electric motor 9, so that it is liable to easily resonate upon receipt of a sound wave propagated through air from the electric motor 9. However, such resonance which easily occurs in the knee protector 14 can be effectively restrained by the dynamic damper 16. Consequently, it is possible to effectively reduce the production of the abnormal sound.

The dynamic damper 16 is provided on a surface, on the side of the motor, of the bracket 12 in such a manner that it is covered with the knee protector 14 from the driver. Consequently, the dynamic damper 16 does not preferably interrupt the driver.

In the dynamic damper 16, the weight 18 is supported on the bracket 12 through the elastic member 17. Consequently, the dynamic damper 16 can effectively restrain the resonance of the bracket 12.

Figure 5:
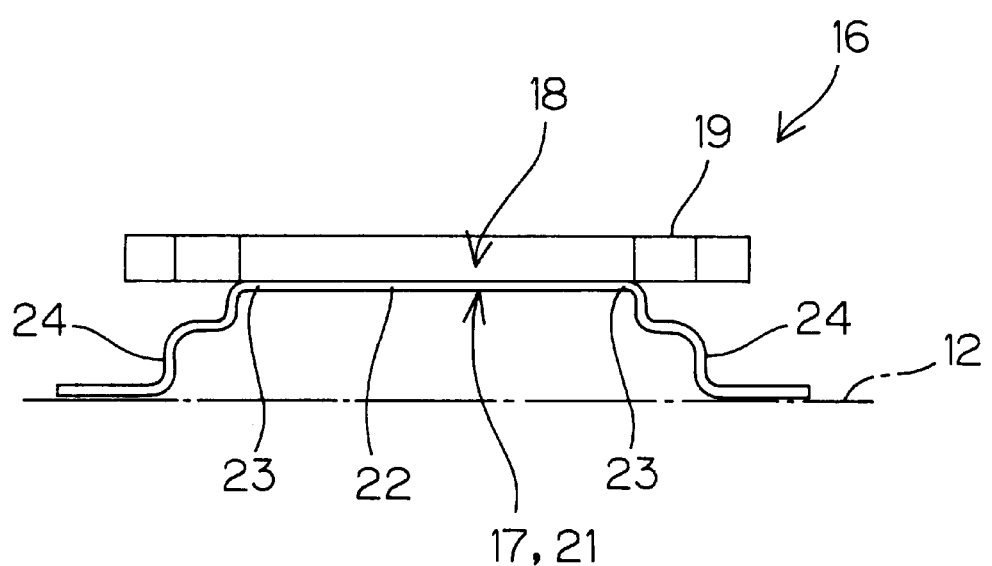
FIG. 5 is a front view of the dynamic damper shown in FIG. 2.

As the dynamic damper 16 according to the first embodiment, the weight 18 is a member made of a metal forming the shape of a plate parallel to the bracket 12, as shown in FIGS. 3 to 5. The elastic member 17 is composed of a plate member 21 made of a metal, and comprises a plate-shaped receiver 22 fixed to the weight 18 along a plate surface 19 of the weight 18, and a plurality of, for example, two elastic legs 24 composed of a plate member made of a metal for supporting both ends 23 of the receiver 22 on the bracket 12. The elastic legs 24 are so constructed that a clearance which is relatively displaceable is provided between the bracket 12 and the plate surface 19 of the weight 18 while making their plate surfaces approximately parallel to each other. The elastic leg 24 is folded in a stepped shape, and a plurality of pieces forming the stepped shape are elastically deformed in a direction perpendicular to the plate surface 19 or a direction parallel to the plate surface 19 and are formed so as to be displaceable. The dynamic damper 16 can be thinned by thus supporting the plate-shaped weight 18 parallel to the bracket 12 on the plate member made of a metal. Consequently, the dynamic damper 16 may not interrupt the driver. Therefore, the dynamic damper 16 is preferable for the steering apparatus 1 a part of which is positioned inside of the vehicle. That is, an effective space for the driver is not narrowed inside of the vehicle. Further, the elastic member 17 made of a metal may not degrade due to oil or chemicals.

As materials for the plate member 21 made of a metal, a known metal material, for example, a material capable of exhibiting a spring function utilizing bending can be utilized in addition to a spring steel.

Figure 6:
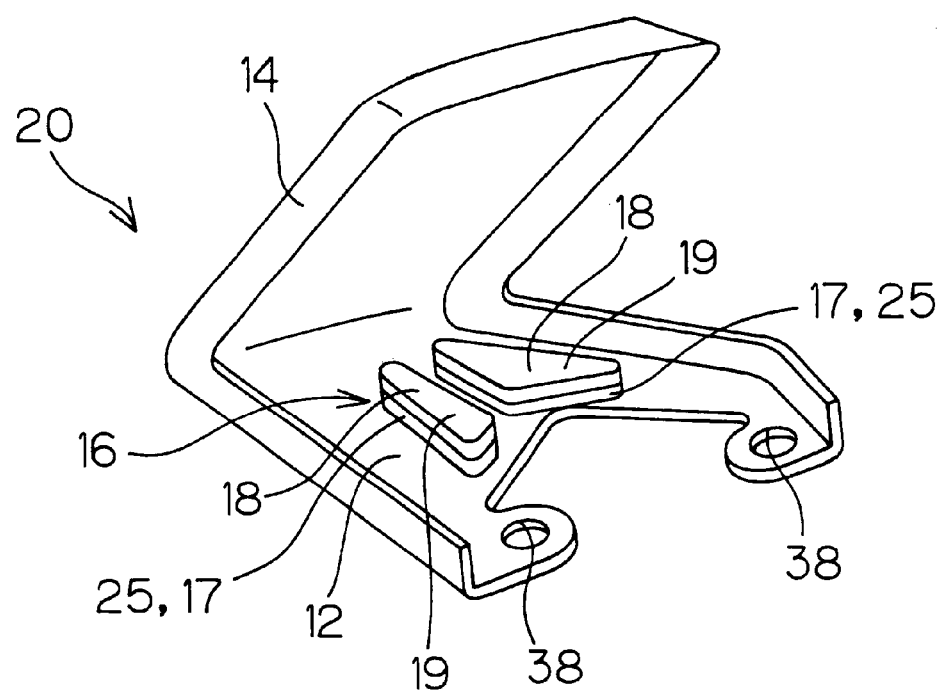
FIG. 6 is a perspective view of a knee protector according to a second embodiment of the present invention.

As a dynamic damper 16 according to a second embodiment, plate-shaped rubber 25 is used in place of the elastic leg 24 as the elastic member 17, as shown in FIG. 6. In the second embodiment, points different from those in the first embodiment will be mainly described, and the same reference numerals are assigned to the same constituent elements and hence, the description thereof is not repeated.

A weight 18 is a member made of a metal forming the shape of a plate parallel to a bracket 12. An elastic member 17 includes a plate-shaped rubber 25 interposed between a plate surface 19 of the weight 18 and the bracket 12. The rubber 25 is made to adhere to the bracket 12 on its surface, and is made to adhere to the weight 18 on the other surface. The rubber 25 elastically supports the weight 18 so as to be displaceable in all directions while making plate surfaces of the bracket 12 and the weight 18 parallel to each other. As materials for the rubber 25, natural rubber and synthetic rubber, for example, can be utilized. A plurality of, for example, two sets of weights 18 and rubbers 25 are provided on the bracket 12, constituting the dynamic damper 16. The dynamic damper 16 can be thinned by thus supporting the plate-shaped weight 18 parallel to the bracket 12 on the plate-shaped rubber 25. Accordingly, the dynamic damper 16 may not interrupt a driver.

As described in the foregoing, according to the embodiments of the present invention, the resonance of the resonance restraint object member 20, such as the knee protector 14 and the brackets 12 and 13, caused by vibration from the electric motor 9 can be restrained by providing the dynamic damper 16, thereby making it possible to reduce the production of the abnormal sound by the resonance.

The present invention is also applicable to a known steering apparatus having a steering mechanism of another construction in addition to a steering mechanism of a rack and pinion type.

Although the present invention was described in detail by specific embodiments, those skilled in the art who have understood the above-mentioned contents will easily consider its modification, alteration, and equivalents. Consequently, the present invention should be in a scope of claims and a scope equivalent thereto.

What is claimed is:

1. An electric power steering apparatus, comprising a steering column, and an electric motor connected to the steering column, for producing a steering assist force, further comprising:

a member, connected to the steering column, to which vibration from the electric motor is transmitted, and a dynamic damper for restraining a resonance of the member to which the vibration is transmitted, wherein the member to which the vibration is transmitted comprises a bracket fixed to the steering column, the bracket supporting a member to be supported, and wherein the member to be supported comprises a knee protector.

2. The electric power steering apparatus according to claim 1, wherein the bracket for supporting the knee protector and a case of the electric motor are together fastened to the steering column.

3. The electric power steering apparatus according to clam 1, wherein the bracket corresponding to the knee protector is integrally formed using a single sheet metal.

4. An electric power steering apparatus, comprising a steering column, and an electric motor connected to the steering column, for producing a steering assist force, further comprising:

a member, connected to the steering column, to which vibration from the electric motor is transmitted, and a dynamic damper for restraining a resonance of the member to which the vibration is transmitted, wherein the member to which the vibration is transmitted comprises a bracket fixed to the steering column, the bracket supporting a member to be supported, and wherein the dynamic damper comprises an elastic member and a weight supported on the bracket through the elastic member.

5. The electric power steering apparatus according to claim 4, wherein the weight is in a shape of a plate parallel to the bracket.

6. The electric power steering apparatus according to claim 5, wherein the elastic member is composed of a plate member made of a metal.

7. The electric power steering apparatus according to claim 6, wherein the elastic member comprises a plate-shaped receiver fixed to the weight along a plate surface of the weight, and an elastic leg supported by the bracket and elastically supporting the receiver.

8. The electric power steering apparatus according to claim 7, wherein the elastic leg comprises a plate member made of a metal extending from an opposite end of the receiver to the bracket.

9. The electric power steering apparatus according to claim 8, wherein he elastic leg is folded in a stepped shape.

10. The electric power steering apparatus according to claim 5, wherein the elastic member includes a plate-shaped rubber interposed between the plate surface of the weight and the bracket.

* * * * *